United States Patent
Witkin

[15] 3,650,657
[45] Mar. 21, 1972

[54] YOKE TYPE ISOSTATIC PRESS

[72] Inventor: Donald E. Witkin, Warren, Pa.

[73] Assignee: National Forge Company, Irvine, Pa.

[22] Filed: Aug. 5, 1970

[21] Appl. No.: 61,349

[52] U.S. Cl. ..........................425/389, 18/DIG. 26, 25/45, 425/77, 425/78
[51] Int. Cl. .........................................B29c 3/00, B30b 5/02
[58] Field of Search ............................18/5 H; 264/56; 25/45

[56] References Cited

UNITED STATES PATENTS

| | | | |
|---|---|---|---|
| 2,851,725 | 9/1958 | Bauer | 18/DIG. 26 |
| 3,034,191 | 5/1962 | Schaefer et al. | 18/5 H UX |
| 3,172,153 | 3/1965 | Loomis et al. | 18/5 H |
| 3,193,900 | 7/1965 | Wendt | 18/5 H X |
| 3,379,043 | 4/1968 | Fuchs | 18/DIG. 26 |
| 3,454,997 | 7/1969 | Ligon et al. | 18/5 H UX |
| 3,462,797 | 8/1969 | Asbury | 18/5 H UX |
| 3,477,096 | 11/1969 | Bowles et al. | 18/5 H |
| 3,502,755 | 3/1970 | Murray | 264/56 |
| 3,557,405 | 1/1971 | Bowles | 18/5 H |

Primary Examiner—J. Howard Flint, Jr.
Attorney—Philip M. Shaw, Jr.

[57] ABSTRACT

An isostatic press comprising an upstanding, hollow cylindrical vessel body which has both upper and lower ends sealed with plug type closures held in place by a yoke structure. The pressurization within the closed vessel is applied to a hydraulic structure to continuously lift the vessel body into contact with the upper closure when a predetermined pressurization is exceeded. In one embodiment the hydraulic structure includes a lower closure seal having a diameter which exceeds the diameter of the upper closure seal. In another embodiment the hydraulic structure includes hydraulic cylinders, which are connected by fluid passages to the interior of the pressure vessel, and which exert an upward force on the vessel body by means of extendable piston rods.

5 Claims, 3 Drawing Figures

Patented March 21, 1972 3,650,657

YOKE TYPE ISOSTATIC PRESS

BACKGROUND OF THE INVENTION

In many isostatic pressure vessels it is necessary that a fixed dimensional relationship be maintained between the cylindrical vessel body and the upper closure. One such type is the fixed mold or "dry bag" assembly. In such an assembly a rubber mold, or so called dry bag, is supported in the annular corner formed by the upper edge of the vessel body wall and the upper closure. If a relative movement occurs between the upper closure and the vessel body while the isostatic press is pressurized, the rubber mold will be forced upward, shearing its mounting lugs which are fitted into the vessel wall.

This problem does not normally occur in pressure vessels having threaded closures. In pressure vessels where the upper closure is retained by an external structure such as a yoke, however, by the inherent nature of such a structure a significant elastic deformation may take place upon pressurization. This allows a gap to form between the upper vessel wall and the upper closure. Since the vessel body normally rests upon the lower closure (due to its weight), all of the separation is manifested between the upper closure and the vessel body. In a typical design this separation can be of the order of magnitude of one-half inch. A rubber mold fixed to the vessel by lugs would be destroyed under such circumstances.

The present invention overcomes these and other disadvantages as will be apparent from the following summary and description of the invention.

SUMMARY OF THE INVENTION

In accordance with the invention, there is provided a high pressure vessel comprising an upstanding, hollow, open-ended vessel body, an upper and a lower plug type closure, and closure seals for the vessel body. An elastically deformable support, such as a yoke structure, retains the upper closure in a sealed relationship with the vessel body. The vessel body rests upon the lower closure. Hydraulic means are provided for utilizing the pressurization within the closed vessel body to lift the vessel body and to maintain it in continuous contact with the upper closure after a predetermined pressurization within the closed vessel body is exceeded.

In one embodiment of the invention the upper and lower closure seals are dimensioned relative to each other such that the radial, cross-sectional area bounded by the lower seal exceeds the radial, cross-sectional area bounded by the upper seal. The difference in the cross-sectional areas is at least equal to the quotient of the weight of the vessel body divided by a predetermined pressure which is less than the minimum pressurization necessary to cause the upper closure retaining support structure to elastically deform. This difference between the cross-sectional areas of the lower and upper seals is acted upon by the pressure within the vessel to produce a lifting force equal to the weight of the vessel body at the predetermined pressure.

In a 25 inch internal diameter cylindrical pressure vessel of one embodiment of the invention the diameter of the lower seal exceeds the diameter of the upper seal by one hundred and sixty eight thousandths of an inch to form an annulus which when multiplied by a low pressure, such as 2,000 p.s.i., will represent a lifting force equal to the weight of the vessel body, or about 6500 pounds. At a higher pressure the vessel body is pushed firmly against the upper closure.

At this relatively low pressure (an isostatic press normally operates at pressures in excess of 10,000 p.s.i.), there is substantially no deformation of the supporting yoke structure so that negligible separation takes place before the pressure in the vessel body is sufficient to lift it. Thus a constant geometrical relationship is maintained to accommodate a fixed mold, or for such other reasons as may be dictated by a specific process.

It is a concept of the invention to use pressure within the vessel body to create a balancing force which will, at low pressure levels, lift the vessel body into contact with the upper closure. Although in one embodiment this is accomplished by having the cross-sectional area bounded by the upper closure seal, in another embodiment the internal pressure is applied to a set of auxiliary hydraulic cylinders having a combined area sufficient to lift the vessel body in contact with the upper closure when the vessel is subjected to a predetermined internal pressure.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
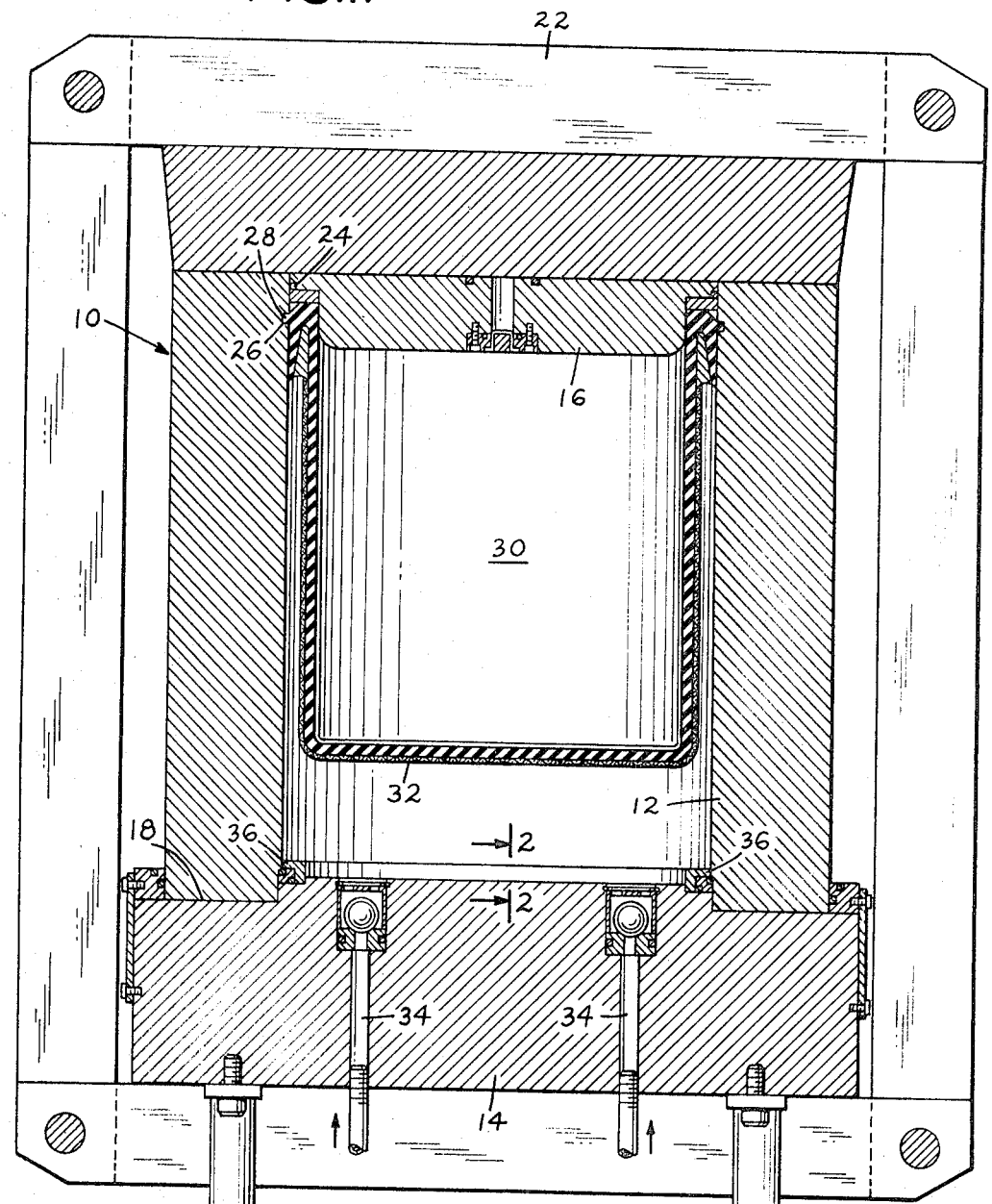
FIG. 1 is a view in central vertical section of a high pressure vessel of one embodiment of the invention.

Referring now to FIG. 1 there is shown a pressure vessel 10 with an open-ended, hollow cylindrical vessel body 12, a lower, plug type closure 14 and an upper, plug type closure 16. The vessel body 12 rests upon a shoulder 18 of the lower closure 14. The lower closure 14 rests upon the supports 20. The upper closure 16 is restrained in place by a yoke assembly 22 which surrounds the pressure vessel.

The upper closure 16 is sealed against the upper, interior edge of the vessel body 12 by an annular seal 24. Slightly below the upper edge of the vessel body 12 is an interior, annular groove 26. This groove 26 accepts a lug 28 on a rubber mold 30. The rubber mold 30 is in the shape of a bag and the material to be compacted (not shown) rests inside the bag. The mold 30 is supported by metal meshwork 32. Fluid (not shown) enters the vessel outside of the bag through the check valves 34 in the lower closure 14. The fluid is pumped in under high pressure and exerts an isostatic pressure about the bag, compacting the material inside of it.

The pressurized fluid tends to force the closures 14 and 16 outwardly, but because the vessel body 12 rests upon the lower closure 14 any separation which occurs between the vessel body and the closures due to the elastic deformation of the surrounding yoke assembly 22 is manifested between the vessel body 12 and the upper closure 16. The rubber mold 30 is forced by the pressurized fluid into the annular corner formed between the upper edge of the pressure vessel body 12 and the upper closure 16. Separation of the upper closure from the vessel body due to elastic deformation of the yoke assembly 22 would shear off the lug 28 in the groove 26. This would ruin the rubber mold because the fluid would then be in communication with the material being compacted.

Figure 2:
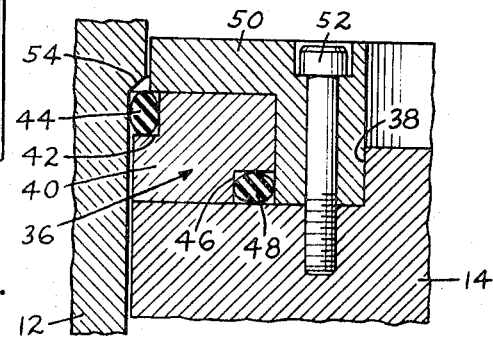
FIG. 2 is an enlarged sectional view taken generally along the line 2—2 of FIG. 1.

The embodiment of FIGS. 1 and 2 overcomes this problem by having an enlargement of the interior diameter of the vessel body at its base and a lower seal for the lower closure which is greater in diameter than the upper seal. The enlargement provides an annular cross section at the base of the pressure vessel body upon which the pressurized fluid within the vessel may act in an upward direction to continuously lift the vessel body into contact with the upper closure during pressurization.

Referring now more particularly to FIG. 2 a portion of a lower seal 36 is shown in section and in enlarged form for purposes of clarity. The seal 36 is seated in an L-shaped annular recess 38 at the upper periphery of the portion of the lower closure 14 which is inserted into the opening of the vessel body 12. The lower seal 36 is comprised of an annular sealing ring 40 which has a substantially rectangular cross section.

The sealing ring 40 has an L-shaped annular, recess 42 in its upper and outer corner. Within this recess 42 is seated an O- ring seal 44 which is squeezed between the sealing ring 42 and the interior wall of the vessel body 12 when the lower closure is in place. In the diagonally opposite, interior corner of the sealing ring 40 is another annular, L-shaped recess 46 within which is seated still another O-ring 48 which is squeezed between the sealing ring 40, and the lower side of the annular recess 38, and the side of one leg of an L-shaped retaining ring 50. The retaining ring 50 is affixed by screws 52 to the interior corner of the recess 38. The sealing ring 40 is held firmly in place by the other leg of the L-shaped retaining ring 50.

As can be more clearly seen in FIG. 2 the vessel body 12 undergoes a cross-sectional enlargement 54 of its internal diameter at a point just above where the O-ring 44 is in contact with the vessel wall. It is upon this cross-sectional enlargement 54 that the pressurized fluid acts to exert an upward force which lifts the vessel body 12 into contact with the upper closure 16. The magnitude of this enlargement 54 varies with design of the pressure vessel and particularly with its weight.

For any specific pressure vessel the upper and lower seals are so dimensioned relative to each other that the radial, cross-sectional area bounded by the lower seal exceeds the radial, cross-sectional area bounded by the upper seal by at least an amount equal to the quotient of the weight of the vessel body divided by a predetermined pressure which is less than the probable minimum pressurization necessary to cause the yoke assembly to elastically deform. For a typical pressure vessel this predetermined pressure may be of the order of 2,000 p.s.i.

The above description can be reduced to a mathematical equation based on the vertical forces being exerted on the vessel body and the closures by the internal pressurization. The equation allows a rough determination of the radial magnitude of the enlargement 54 to be made for purposes of design:
Where $P =$ a predetermined pressure which is
less than the minimum pressurization
necessary to cause the yoke assembly
22 to elastically deform;

$R =$ the internal radius of the vessel
body 12 below the cross-sectional
enlargement 54;

$r =$ the internal radius of the vessel
body 12 above the cross-sectional
enlargement 54;

$W =$ the weight of the vessel body 12;

$pi =$ the standard mathematical constant;

$P \times$ (cross-sectional area of enlargement 50) $= W$ $P \times (pi \times R^2 - pi \times r^2) = W$ $P \times pi \times (R^2 - r^2) = W$ $P \times pi \times (R + r) \times (R - r) = W$ $R - r =$ the radial magnitude of the enlargement 54

$R - r = \dfrac{W}{P \times pi \times (R + r)}$

Since the term $(R + r)$ is several orders of magnitude larger than the term $(R - r)$, the term $(R + r)$ may be approximated for purposes of an initial vessel design by the term $D$ where $D =$ the average internal diameter of the vessel body
Thus $R - r = \dfrac{W}{P \times pi \times D}$ In one preferred embodiment of the invention the values of the above variables are substantially as follows:

| | | |
|---|---|---|
| R = | 12.5875 inches | (Thus the difference |
| r = | 12.5035 inches | of the diameters of the |
| W = | 6,500 pounds | upper and lower seals is |
| | | 0.168 inches) |

With these values the vessel body will be lifted firmly in contact with the upper closure for pressurization in excess of 2,000 p.s.i.

Figure 3:
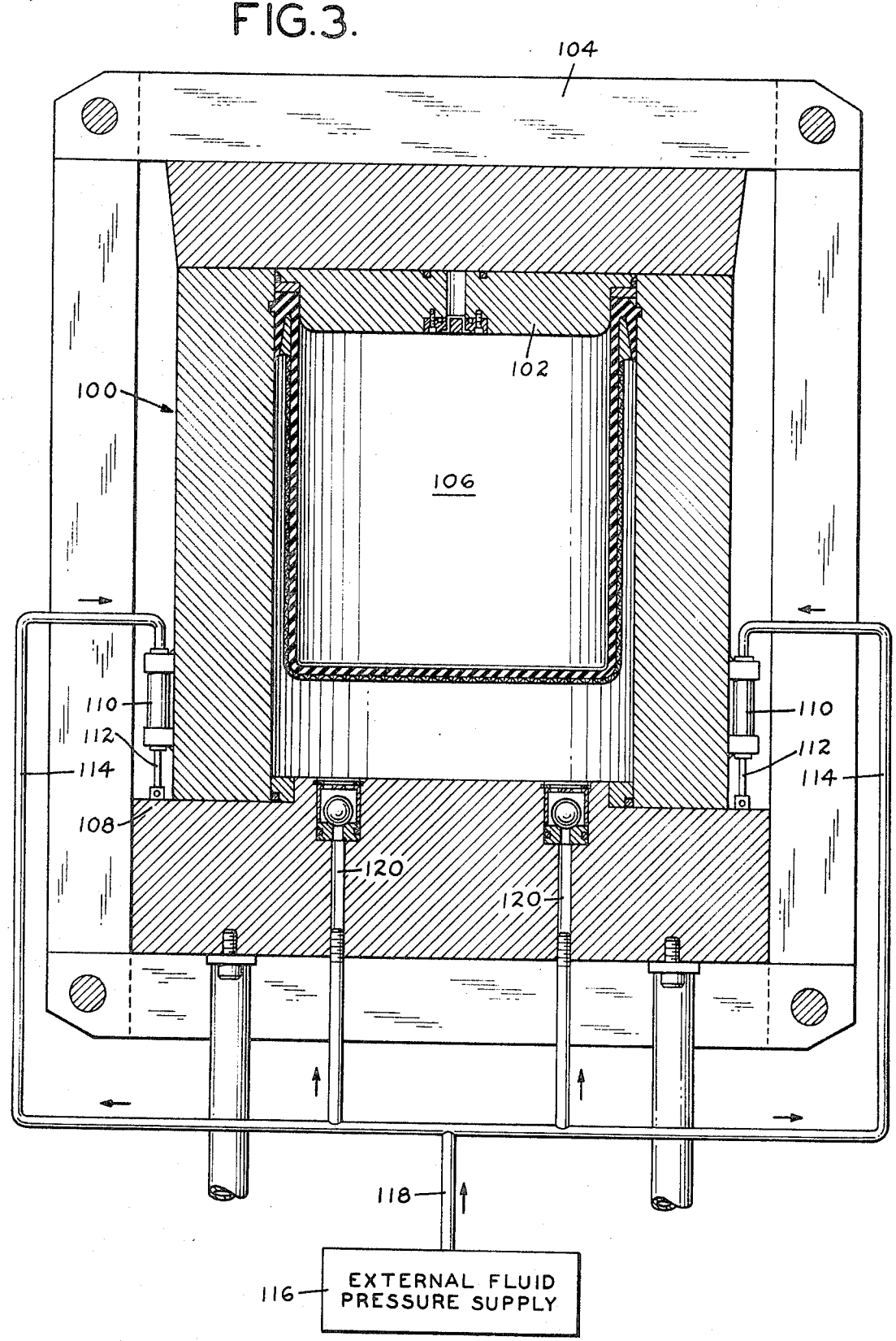
FIG. 3 is a diagramatic view of a second embodiment of the invention.

Another embodiment which maintains a constant dimensional relationship between the vessel body and the upper closure is shown in FIG. 3 as comprising a vessel body 100 having an upper closure 102 which is restrained by a yoke assembly 104. A dry mold in the form of a bag 106 is lug mounted at the upper interior edge of the vessel body 100. The upper closure 102 is sealed against the vessel body 100 in the same manner as the upper closure 16 of the embodiment of FIGS. 1 and 2, however, the lower closure 108 is sealed against the vessel body in a standard manner utilizing O-rings without a cross-sectional enlargement of the vessel's internal diameter.

The vessel body 100 is forced into contact with the upper closure 102 by means of a plurality of hydraulic cylinders 110 which are mounted about the base of the vessel body and welded or otherwise affixed to its outside walls. Each cylinder 110 has a piston rod 112 protruding downwardly and pivotally affixed to the portions of the lower closure 108 which projects beyond the bottom of the vessel body.

The cylinders 110 are connected as a group by a piping network 114 which in turn is in communication with the fluid pressure supply 116 and the piping system 118 which connects to a fluid input check valves 120 in the lower closure 108.

Thus when fluid under pressure from the source 116 enters the interior of the isostatic press through the check valves 120, fluid at the same pressure is also applied to the pistons within the cylinders 110. The combined cross-sectional area of the pistons within the cylinders 110 is calculated such that at a predetermined pressure, such as 2,000 p.s.i., which is less than the minimum pressure necessary to deform the yoke assembly 104, the upward force exerted by the cylinders upon the vessel body 100 will lift it firmly against the upper closure 102. In this way a constant dimensional relationship is maintained between the vessel body and the upper closure to protect the lug mounting of the mold 106 from shearing.

The terms and expressions which have been employed herein are used as terms of description and not of limitation, and there is no intention, in the use of such terms and expressions, of excluding equivalents of the features shown or described, or portions thereof, it being recognized that various modifications are possible within the scope of the invention claimed.

What is claimed is:

1. A high pressure vessel comprising an upstanding vessel body open at both ends, an upper and a lower plug type closure for the open ends of the vessel body, means external to the vessel body for retaining the upper and lower closures in a sealed relationship with the ends of the vessel body, means for internally pressurizing the sealed vessel body, and hydraulic means for applying the pressure within the sealed vessel body to exert an upward, lifting force upon the vessel body.

2. A high pressure vessel comprising an upstanding, open ended vessel body, an upper and a lower closure for the vessel body, an upper seal between the upper closure and the upper open end of the vessel body and a lower seal between the lower closure and the lower open end of the vessel body, an elastically deformable support for retaining the upper closure in a sealed relationship with the vessel body, the upper and lower seals being so dimensioned relative to each other that the radial, cross-sectional area bounded by the lower seal exceeds the radial, cross-sectional area bounded by the upper seal by at least an amount equal to the quotient of the weight of the vessel body divided by a predetermined pressure which is less than the minimum pressurization necessary to cause the upper closure retaining support to elastically deform.

3. A high pressure vessel comprising an upstanding, hollow, cylindrical vessel body open at both ends and having an annular cross-sectional enlargement of its interior diameter intermediate its ends, an upper plug type closure for the vessel body, a lower plug type closure for the vessel body beneath the cross-sectional enlargement in the vessel body, and an elastically deformable means for retaining the upper and the lower closures in a sealed relationship with the vessel body, the radial magnitude of the enlargement in the vessel body interior diameter being at least equal to the quotient of the weight of the vessel body in pounds divided by the product of a predetermined pressure which is less than the minimum pressurization necessary to cause the retaining means to elastically deform times the average diameter of the vessel body in inches times the mathematical constant *pi*.

4. A high pressure vessel as recited in claim 3 wherein the radial magnitude of the enlargement is at least equal to the quotient of the weight of the vessel body in pounds divided by the product of 2000 p.s.i. times the average diameter of the vessel body in inches times the mathematical constant *pi*.

5. A high pressure vessel comprising an upstanding, hollow vessel body open at both ends, an upper plug type closure, a lower plug type closure, means for retaining the upper and the lower closures in a sealed relationship with the vessel body, a plurality of hydraulic cylinders affixed to the exterior vessel body wall at equal intervals, each of the cylinders having an internal piston and a piston rod extending from the cylinders, means for restraining the projecting ends of the piston rods so as to be longitudinally immovable relative to the lower closure, and means for injecting fluid under pressure simultaneously into the cylinders and into the hollow interior of the vessel body while it is in a sealed relationship with the closures, the combined cross-sectional area of the pistons being such that for a predetermined fluid pressure within the cylinders, which is less than the minimum pressure necessary within the sealed vessel body to cause the closure retaining means to deform, the cylinders will exert a lifting force on the vessel body at least equal to the weight of the vessel body.

* * * * *

UNITED STATES PATENT OFFICE
CERTIFICATE OF CORRECTION

Patent No. 3,650,657          Dated March 21, 1972

Inventor(s)   Donald E. Witkin

It is certified that error appears in the above-identified patent and that said Letters Patent are hereby corrected as shown below:

Col. 3, lines 54 and 55   Change "R-r = $\dfrac{W}{P \times pi \times (R+r)}$" to --R-r = $\dfrac{W}{P \times pi \times (R-r)}$--

Col. 3, lines 60 and 61   Change "Thus R-r = $\dfrac{W}{P \times pi \times D}$" to --Thus R-r = $\dfrac{W}{P \times pi \times D}$--

Signed and sealed this 27th day of May 1975.

(SEAL)
Attest:

RUTH C. MASON
Attesting Officer

C. MARSHALL DANN
Commissioner of Patents
and Trademarks